United States Patent
Berchowitz et al.

(10) Patent No.: US 7,075,292 B2
(45) Date of Patent: Jul. 11, 2006

(54) APPARATUS FOR DETERMINING FREE PISTON POSITION AND AN APPARATUS FOR CONTROLLING FREE PISTON POSITION

(75) Inventors: David M. Berchowitz, Athens, OH (US); Robert Lee Mash, II, Pomeroy, OH (US)

(73) Assignee: Global Cooling BV, Helmond (NL)

( * ) Notice: Subject to any disclaimer, the term of this patent is extended or adjusted under 35 U.S.C. 154(b) by 49 days.

(21) Appl. No.: 11/005,710

(22) Filed: Dec. 7, 2004

(65) Prior Publication Data

US 2006/0119350 A1 Jun. 8, 2006

(51) Int. Cl.
*G01B 7/14* (2006.01)

(52) U.S. Cl. .............................. 324/207.2; 324/207.24; 702/150

(58) Field of Classification Search .......... 324/207.12, 324/207.2, 207.21, 207.24; 338/32 R, 32 H; 702/150, 142, 158; 60/520

See application file for complete search history.

(56) References Cited

U.S. PATENT DOCUMENTS

| | | | |
|---|---|---|---|
| 4,602,174 A | | 7/1986 | Redlich |
| 6,050,092 A | * | 4/2000 | Genstler et al. ............... 60/520 |
| 6,094,912 A | * | 8/2000 | Williford ...................... 60/520 |
| 2003/0030431 A1 | | 2/2003 | Reininger |

FOREIGN PATENT DOCUMENTS

JP 1989-64-031002 2/1989

\* cited by examiner

*Primary Examiner*—Jay M. Patidar
(74) *Attorney, Agent, or Firm*—Frank H. Foster; Kremblas, Foster, Phillips & Pollick

(57) ABSTRACT

An apparatus for determining position of a free piston used in such as hydraulic compressor, which has no mechanical connection with crank shaft, and an apparatus for controlling reciprocating motion of the free piston are disclosed. A free piston position determining apparatus comprises a magnetic sensor disposed in a case containing a free piston, and a magnet disposed on the free piston. The magnet sensor generates pulse train when the magnet is positioned within a pre-determined distance form the magnet sensor. Stroke of the free piston is computed based on duration of the pulse, and offset of the average piston position from designed average position is computed based on interval of the pulse.

5 Claims, 5 Drawing Sheets

APPARATUS FOR DETERMINING FREE PISTON POSITION AND AN APPARATUS FOR CONTROLLING FREE PISTON POSITION

BACKGROUND OF THE INVENTION

1. Field of the Invention

The present invention relates to an apparatus for determining position of a free piston such as reciprocating piston in hydraulic compressor, which has no mechanical connection with driving means like a crank shaft, and an apparatus for controlling reciprocating motion of the free piston.

2. Description of the Related Art

A free piston machine has a reciprocating piston with no mechanical connection with a driving crank-shaft. Rather, a linear motor or an alternator is often used to drive or load a free piston in its cylinder (such as the invention disclosed in reference 1). These machines are put into practical use as gas compressors, Stirling coolers, Stirling engines, and other free piston machines.

The free piston machine inherently lacks absolute piston displacement control of its free piston, because the free piston is not mechanically connected with a crank shaft. Therefore, its piston motion must be continuously monitored and controlled in order to obtain maximum stroke without noise and possible damages due to over-stroke. An ideal sensor in this application is non-contacting, has no moving parts, and has no need to have itself installed inside the case or pressure vessel of the free piston machine.

Hitherto, in prior arts, means are proposed, in each of which a permanent magnet is disposed on a free piston, and a Hall effect type sensor is disposed on a cylinder, and position of the free piston is determined by the Hall effect type sensor surveying the magnet moving with the free piston (reference 2 and reference 3). These methods are base on a principle, in which a magnetic sensor generates a wave type output signal when a permanent magnet passes across the magnetic sensor, and the wave type output signal has a peak when the permanent magnet approaches to the closest to the magnet sensor. Specifically, a free piston position signal is output when the wave type signal intensity exceeds a given allowable value.

Reference 1: U.S. Pat. No. 4,602,174
Reference 2: JPA 1989-31002
Reference 3: JPA2003-527591

However, these prior arts do not disclose concrete methods of how to detect stroke of a free piston and the average position of reciprocating motion of the free piston. It is principally possible to detect whether a free piston reaches a pre-determined stroke position, if a magnetic sensor is arranged so that strength of an output signal surpasses a set value when the free piston reaches a pre-determined stroke position, i.e. the maximum stroke position. However, in this method, in order to control each of variable strokes of the free piston, plural stroke set values and plural magnetic sensors are needed. Especially, it is virtually impossible to control continuously variable stroke of the free piston. Moreover, it is difficult to know how to detect the average position of reciprocating motion of the free piston with those prior arts.

BRIEF SUMMARY OF THE INVENTION

The first object of the present invention is to provide a free piston position determining apparatus for easily determining each of stroke and average position of reciprocating motion of the free piston in a free piston machine, even when stroke of the free piston varies. The second object of the present invention is to provide a free piston control apparatus for controlling stroke and the average position of reciprocating motion of the free piston, by using the free piston position determining apparatus.

The free piston position determining apparatus according to the present invention comprises a magnetic sensor disposed in a case containing a free piston, and a magnet disposed on the free piston reciprocating in the case. The magnetic sensor generates pulses when the magnet reciprocating with the free piston is positioned within a predetermined distance from the magnetic sensor. Stroke of the free piston is computed based on duration of the pulses, and offset of the average piston position from a designed average position is computed based on intervals between the pulses.

Namely, the free piston position determining apparatus according to the present invention determines stroke and average position of reciprocating motion of a free piston in a free piston machine, and it comprises a pulse train generating means and a free piston position computing means. The free piston machine comprises a case containing a free piston and a driving means for driving the free piston. The free piston is not mechanically connected with the driving means. The pulse train generating means includes a magnet disposed on the free piston and a magnetic sensor disposed on the case.

The magnetic sensor and the magnet is aligned perpendicularly to the direction of reciprocating motion of the free piston, when the free piston is positioned at a designed center of reciprocating motion of the free piston. The magnetic sensor generates pulses when the magnet is positioned within a predetermined distance from the magnetic sensor in the direction of reciprocating motion of the free piston. The free piston position computing means includes measuring means of the duration of the pulses, intervals between the pulses, and velocity of reciprocating motion of the free piston. The free piston position computing means computes stroke of the free piston based on the duration of the pulses and the velocity of reciprocating motion of the free piston, and then computes offset of the average piston position of reciprocating motion of the free piston from a designed average piston position thereof based on the intervals between the pulses, the computed stroke of the free piston, and the velocity of reciprocating motion of the free piston.

It is preferable that the magnetic sensor is a Hall effect type sensor. It is preferable that the free piston machine is a Starling machine. It is preferable that the magnetic sensor is disposed on the external surface of the case.

The free piston control apparatus according to the present invention controls stroke and the average piston position of reciprocating motion of a free piston in a free piston machine. Specifically, the free piston control apparatus compares the actual stroke value and the actual offset value of the average position of reciprocating motion of the free piston with predetermined set-points. Then, the free piston control apparatus feedback-controls the stroke and the average position of reciprocating motion of the free piston based on differences between the actual values and the pre-determined set-points.

The free piston control apparatus according to the present invention includes the free piston position determining apparatus above-mentioned and a reciprocating motion control means of the free piston. The reciprocating motion control means comprises a stroke error computing means, a stroke error signal processing means and a stroke control means.

The reciprocating motion control means also includes an offset error computing means, an offset error signal processing means, and an offset control means.

The stroke error computing means computes difference between computed stroke of the free piston and designed stroke thereof, and outputs the difference as a stroke error signal. The stroke error signal processing means generates a stroke command signal based on the stroke error signal. The stroke control means controls stroke of the free piston based on the stroke command signal.

The offset error computing means computes difference between the computed offset value and a designed offset value, and then outputs the difference as an offset error signal. The offset error signal processing means generates an offset command signal based on the offset error signal. The offset control means controls the average piston position of reciprocating motion of the free piston based on the offset command signal.

The above-mentioned "free piston machine" means a machine having a free piston which reciprocates without any mechanical connection with a crank shaft, and includes, for example, gas compressors, Stirling engines, and so on. "A case containing a free piston" means, for example, a cylinder in which a free piston reciprocates, an external case containing the cylinder, or a pressure vessel. "A free piston driving means" means a free piston driving means without any connection with the free piston, which includes, for example, a means of gas compressors or Stirling engines, which gives a free piston its reciprocating motion by changing operating medium pressure loaded on the end-surfaces of the free piston, or a means of Stirling coolers, which electromagnetically drives a free piston with liner motors, etc.

"A magnet disposed on a free piston" includes a configuration in which the magnet is directly embedded on the external surface of the free piston, and also includes a configuration in which the magnet is disposed on a support element attached to the free piston. "Stirling machines" include both of Stirling engines, which are external-combustion engines, or so-called Stirling coolers. "A free piston position determining apparatus" and "a free piston control apparatus" includes negative feed back controller for controlling stroke and the average position of reciprocating motion of a free piston in a free piston machine.

According to the present invention, following advantageous effects are obtained. The present invention enables to measure stroke and offset of a free piston only with a set of the magnetic sensor and the magnet. This advantage is based on that the free piston position determining apparatus generates pulses when magnetic flux of the magnet disposed on the free piston passes across the magnetic sensor disposed on the case, computes stroke of the free piston based on the duration of the pulses, and then computes offset of the free piston based on the intervals between the pulses.

The present invention simplifies the structure and enhances durability without any abrasion, because either the magnetic sensor or magnet does not have moving parts and are mutually non-contacting with each other. Moreover, as it is not necessary to bring wires out through the case due to the magnetic sensor disposed out side the case, it avoids extra cost as well as simplifies the structure.

Using the Hall effect type sensor as a magnetic sensor is useful for cost reduction and facilitation of designs, because the Hall effect type sensor is widely used and easy to obtain, and its characteristic features are fully disclosed.

Stirling machines are principally excellent in efficiency, quietness and stability. These features become more excellent in compact and low-power Stirling machines. When a free piston position determining apparatus according to the present invention is incorporated either in Stirling engines, which converts reciprocating motion of a free piston into electric power with generators, or Stirling coolers, which electromagnetically drives a free piston with linear motors, it prevents over-stroke and over-displacement of the average piston position of reciprocating motion of the free piston without any mechanical connection with a crank shaft. This feature simplifies the structure of and reduces the size of either the Stirling engines or Stirling coolers.

Reciprocating motion of the free piston can be controlled in appropriate condition in this simple configuration, because the present invention employs an effective feedback controller. In this feedback controller, the piston position determining apparatus and the reciprocating motion control means comprising electronic circuits calculates differences between measured values and designed values for the stroke and the offset, and the differences are used for the feed back control of the free piston. Especially, when a target value of the stroke or the offset for control, for example, a maximum allowable value, is changed, the present invention can easily follow the new target value, i.e. it can control the stroke or offset so as not to exceed the maximum allowable value.

DETAILED DESCRIPTION OF THE INVENTION

Figure 1:
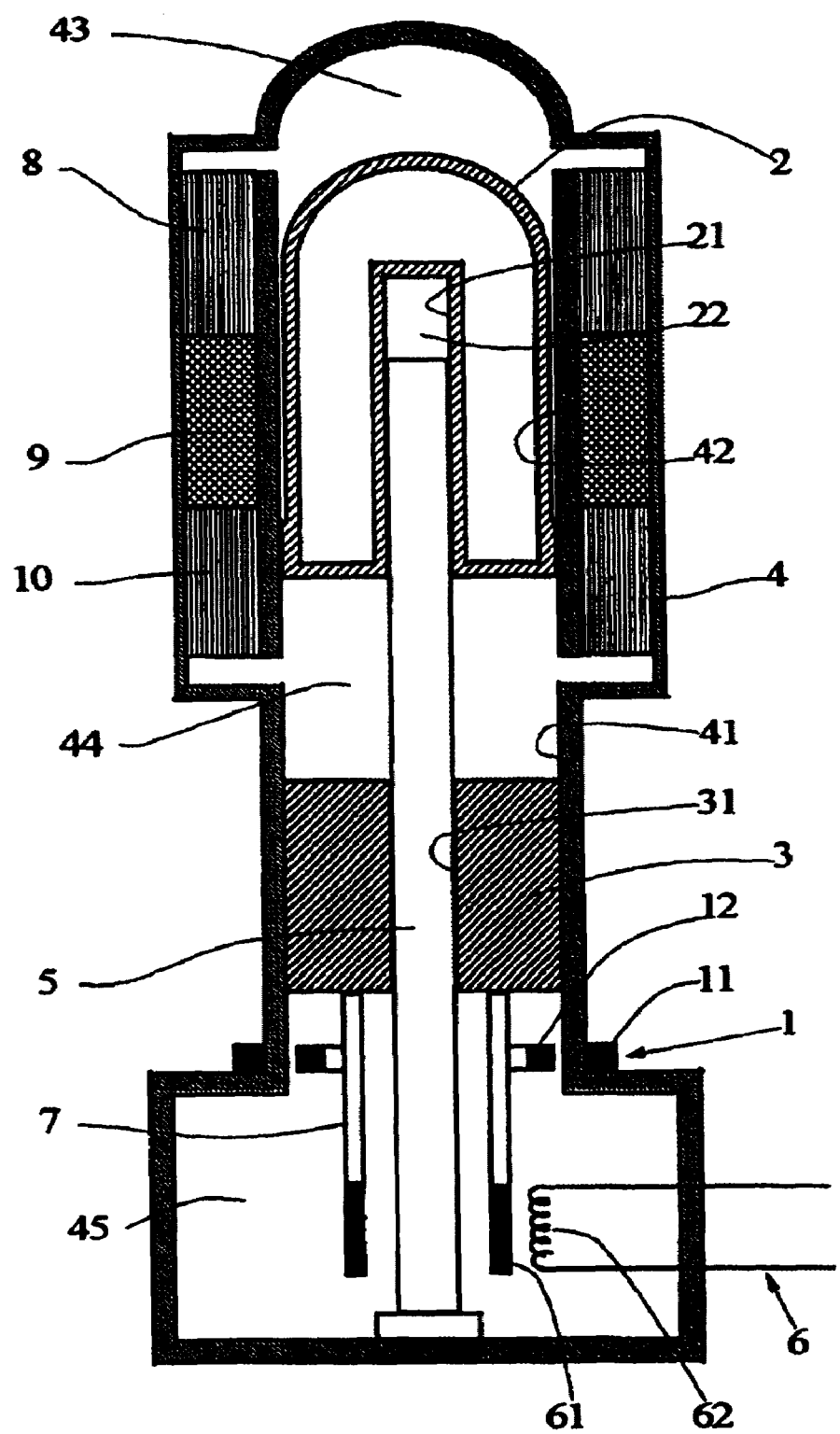
FIG. 1 is a schematic cross section view of a Stirling engine including a free piston position determining apparatus and a free piston position control apparatus according to the present invention.

FIG. 1 discloses an outline of a free piston position determining apparatus according to the present invention, and a Stirling engine including a reciprocating motion control means. First, referring FIG. 1, the configuration and function of the Stirling engine are explained. The Stirling engine itself is well known. In the Stirling engine, a free piston 3 and a displacer 2 reciprocate in cylinder portions 41 and 42 of a case 4, and the directions of reciprocating motion of them are mutually opposite. The case 4 is made of magnetically permeable material such as austenitic stainless steel. In the centers of the free piston 3 and the displacer 2, an axis hole 31 and an axis hole 21 are formed respectively. A rod 5 fixed to the case 4 at an end is inserted in the axis holes 31 and 21. The free piston 3 and the displacer 2 reciprocate by using the rod 5 as a center axis for reciprocating motion.

A heat acceptance exchanger 8, a regenerator 9, and a heat reject exchanger 10 are winded on the external circumference of a cylinder portion 42 in which the displacer 2 is contained. An upper space 43 between an upper portion of the case 4 and an upper end of the displacer 2, a lower space 45 between a lower portion of the case 4 and a lower end of the free piston 3, and a center space 44 between a lower end of the displacer 2 and an upper end of the free piston 3 are formed. A spring space 22 are formed between a closed end of the axis hole 21 in the displacer 2 and an upper end of the rod 5, and the spring space 22 functions as a gas spring. A cylindrical support 7 is connected to the lower end of the free piston 3, and the permanent magnet 61 is attached to the lower end of the cylindrical support 7. The electric coil 62 is windingly arranged in the position facing the magnet 61. The permanent magnet 61 and the electric coil 62 constitute an alternator 6. The interior of the case 4 is filled with high pressure helium gas as operating medium.

Operation of the Stirling engine is explained below. Heat from an outer heat source (not shown in FIG. 1) is provided to the upper space 43 through the heat acceptance exchanger 8, and raises temperature and pressure of Helium gas inside the space 43. Then, pressure of the center space 44 is also raised because the center space 44 communicates with the upper space 43 through the heat acceptance exchanger 8, the regenerator 9, and the heat reject exchanger 10. Then, the free piston 3 is depressed to the lower direction. At that time, the spring space 22 formed inside the displacer 2 is compressed due to the pressure difference between the inner pressure of the spring space 22 and the pressure of the upper space 43, therefore, the displacer 2 moves to lower position.

The displacer 2 is pushed back to upper position and helium gas in the upper space 43 is transferred to the center space 44 by repulsive force of compressed gas in the spring space 22, after completion of movement of the free piston 3 to the lower position. During the transfer, a part of heat of helium gas is accumulated in the regenerator 9. Next, heat of the helium gas inside the center space 44 is rejected to the outside through the heat reject exchanger 10, and the temperature and pressure of helium gas drops. Therefore, the free piston 3 is moved to upper position. At that time, the spring space 22 expands by pressure difference between the pressure in the spring space 22 and the pressure of the upper space 43, and the displacer 2 moves to upper position.

After the completion of displacement of the free piston 3 to the upper position, the displacer 2 is pushed back to lower position by repulsive force of the spring space 22, and helium gas in the center space 44 is moved to the upper space 43. At this time, a part of heat stored in the regenerator 9 is recovered by helium gas. This heat recovery substantially enhances heat efficiency of the Stirling engine.

In summary, the Stirling engine receives heat from an outside heat source, dissipates a part of the heat, converts the remain of the heat to energy of reciprocating motion of the free piston 3, and finally takes out electric energy with the alternator 6. The alternator 6 supports reciprocating motion as a linear motor while this reciprocating motion is unstable after starting the engine.

Figure 6:
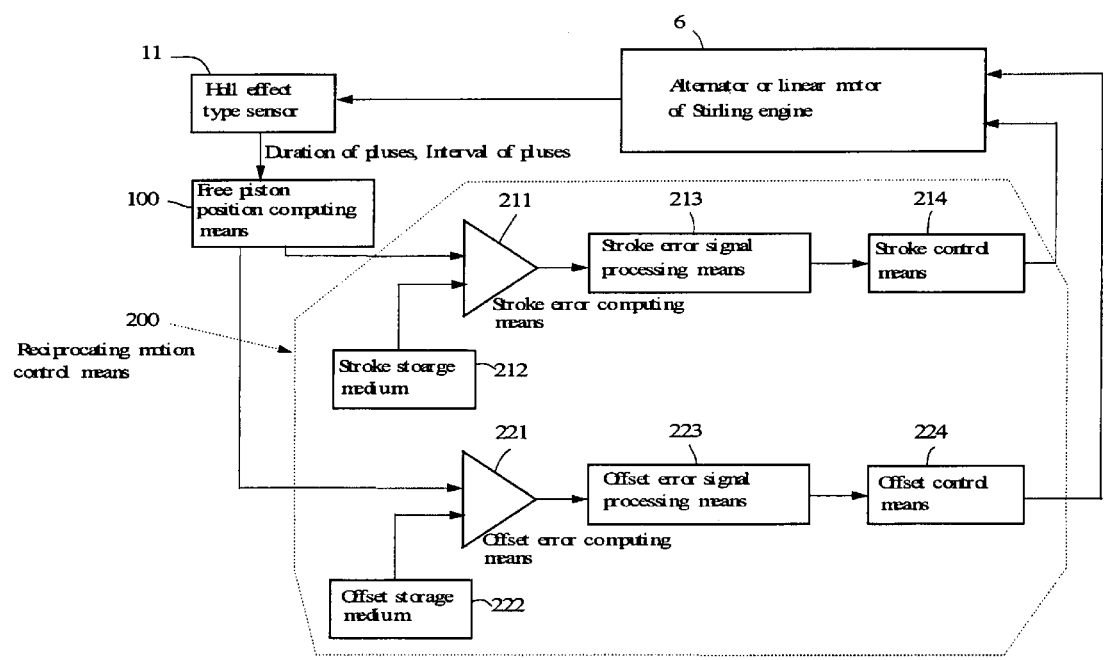
FIG. 6 is a flow diagram showing a control method of the free piston.

The Stirling engine includes a pulse train generating means 1 and a free piston position computing means 100 as shown in FIG. 6. The pulse train generating means 1 has a magnet 12 disposed on a support member 7 connected to the free piston 3 and a Hall effect type sensor 11 disposed on the external surface of the case 4. The Hall effect type sensor 11 and the magnet 12 is aligned perpendicularly to the direction of reciprocating motion of the free piston 3 when the free piston 3 is located at a designed center position of its reciprocating motion.

Figure 2:
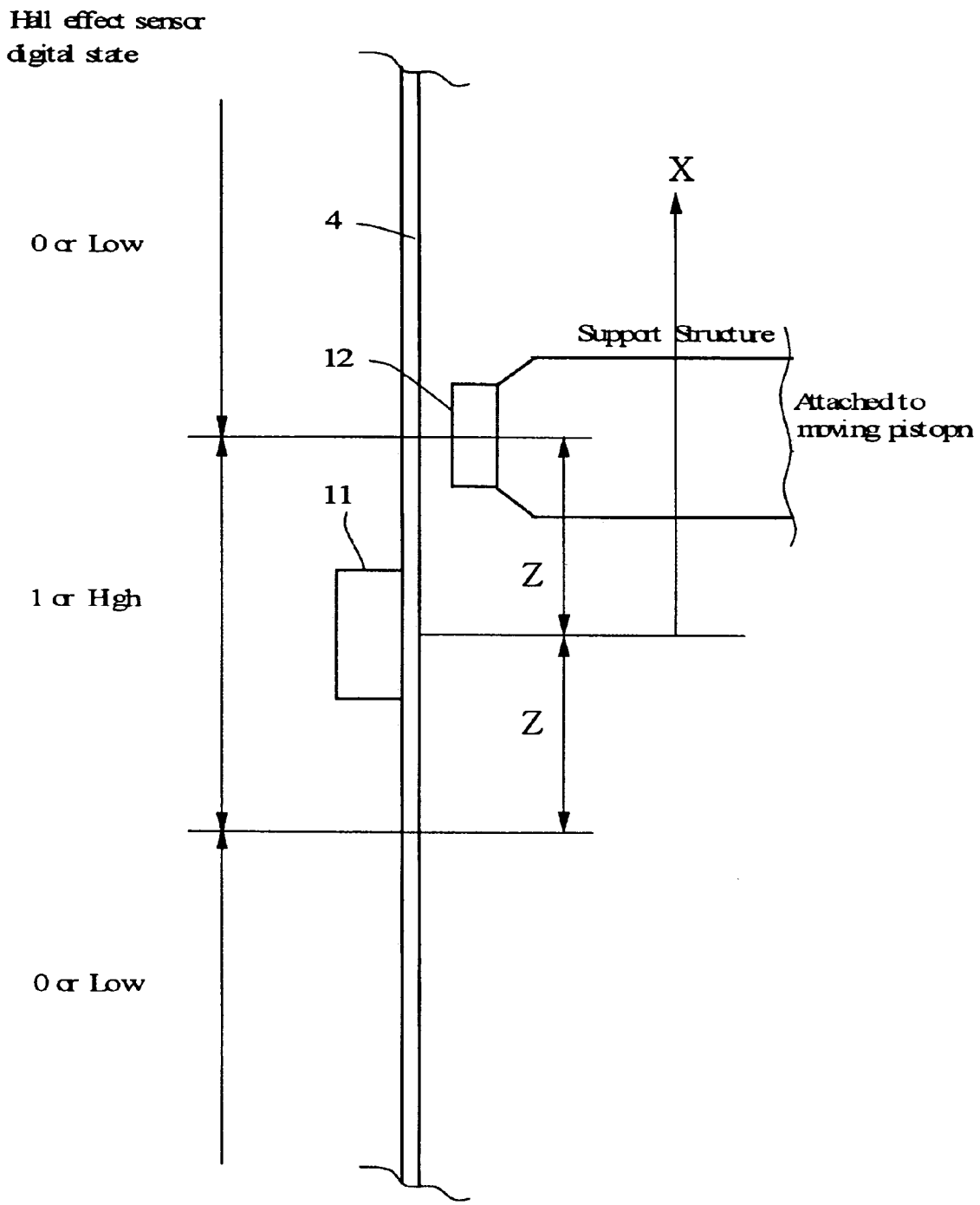
FIG. 2 is a schematic view showing relationship between electrical state of a Hall effect type sensor and distance Z between the Hall effect type sensor and a magnet.

Next, referring FIG. 2, pulse train generation by the pulse train generating means 1 is explained. This is based on a well known principle in that the Hall effect type sensor 11 generates electromotive force to the direction perpendicular to both of magnetic flux and electric current when electric current is passed through the Hall effect type sensor 11. In the present invention, electromotive force is generated in the Hall effect type sensor 11 when magnetic flux discharged from the magnet 12 passes across the Hall effect type sensor 11 as the free piston 3 reciprocates with the magnet 12. Strength of electromotive force is proportional to strength of magnet flux of the magnet 12 and velocity of the magnet 12. Therefore, electromotive force reaches maximum as the magnet 12 passes across the center line of the Hall effect type sensor 11, and it goes down as the magnet moves away from the Hall effect type sensor 11. The Hall effect type sensor 11 changes its electric states to digital 1 or digital 0 depending on the distance between the magnet 12 and the Hall effect type sensor 11.

When the Hall effect type sensor 11 is positioned within the distance Z from the magnet, that is, when electromotive force more than a given value is generated, the electrical state of the Hall effect type sensor 11 becomes high and the Hall effect type sensor 11 responds as digital 1. When the Hall effect type sensor 11 is away from the distance Z and the electromotive force goes down below the given level, electrical state of the Hall effect type sensor becomes low and the Hall effect type sensor 11 responds as digital 0. Thus, the digital 1 response can be used as a pulse signal.

A free piston reciprocating in a free piston machine oscillates in an essentially sinusoidal motion. Thus, position X of the free piston 3 is expressed with equation (1).

$$X = A\sin(\omega t)[M] \quad (1)$$

Where, $\omega = 2\pi *$Frequency of piston oscillation [Hz]
t=time[s]
A=piston stroke [M]
Differentiating equation (1), piston velocity V is expressed with equation (2).

$$V = \omega A\cos(\omega t)[M/s] \quad (2)$$

Maximum piston velocity Vmax is obtained when $\cos(\omega t)$ is 1, and expressed with equation (3), namely, $$V\max = \omega A [M/s] \quad (3)$$

The free piston 3 reaches maximum velocity as it passes across its average reciprocating position. The average reciprocating position corresponds to the position when the magnet 12 is in axial alignment with the Hall effect type sensor 11 perpendicularly to the direction of the reciprocating motion.

When the distance Z is small as compared with stroke A, time necessary for the magnet 12 to pass across the distance Z is very short, therefore, $\cos(\omega t)$ is approximately 1, and so velocity of the free piston 3 is approximated with Vmax=$\omega$A. The time period during which the electrical state of the Hall effect type sensor 11 responds as digital 1, or the time period during which the electrical state thereof becomes high, that is, duration of a pulse T, can be closely approximated with equation (4).

$$T = 2Z/\omega A [s] \quad (4)$$

Thus, the duration of the pulse T is inversely proportional to the stroke A as expressed in equation (5).

$$T \sim 1/A [s] \quad (5)$$

Figure 3:
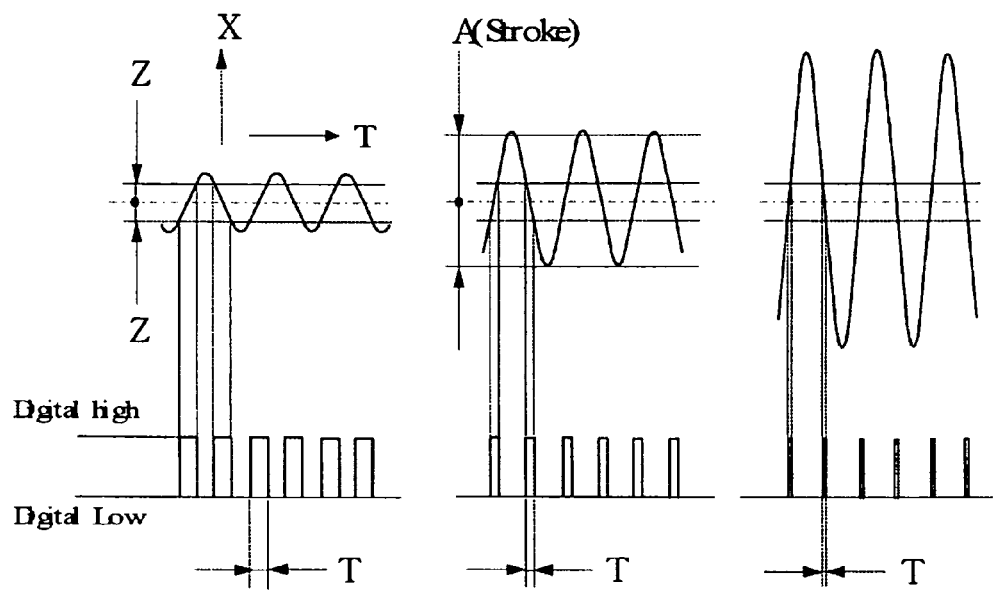
FIG. 3 is a schematic view graphically showing inverse relationship between duration of pulses and piston stroke.

Hence, with measuring the duration of the pulse T, the stroke A can be computed by solving equation (5). The proportional constant in equation (5) is based on the characteristic of a specific physical implementation, and can be determined from the distant Z and the frequency ω). Inverse relationship between the duration of pulses and the piston stroke A is shown graphically in FIG. 3.

Figure 4:
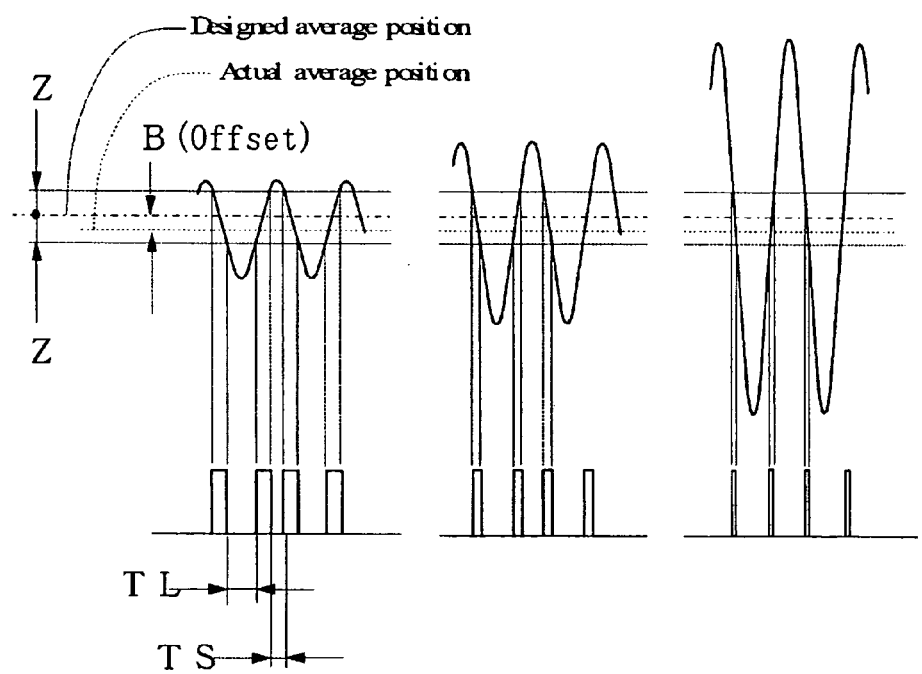
FIG. 4 is a schematic view graphically showing relationship between the pulse intervals and the offset of the free piston.

The average piston position of the free piston 3 is generally determined based on the average force acting on the piston face. A common occurrence in free piston machines is unwanted drift or offset of the average piston position from a desired average position in a design. This offset changes successive intervals between pulses in the pulse train generated with the Hall effect type sensor 11 as shown in FIG. 4. The present invention employs a timing circuit to measure any of those intervals between pulses and a digital microcomputer to compute offset of the free piston 3.

Figure 5:
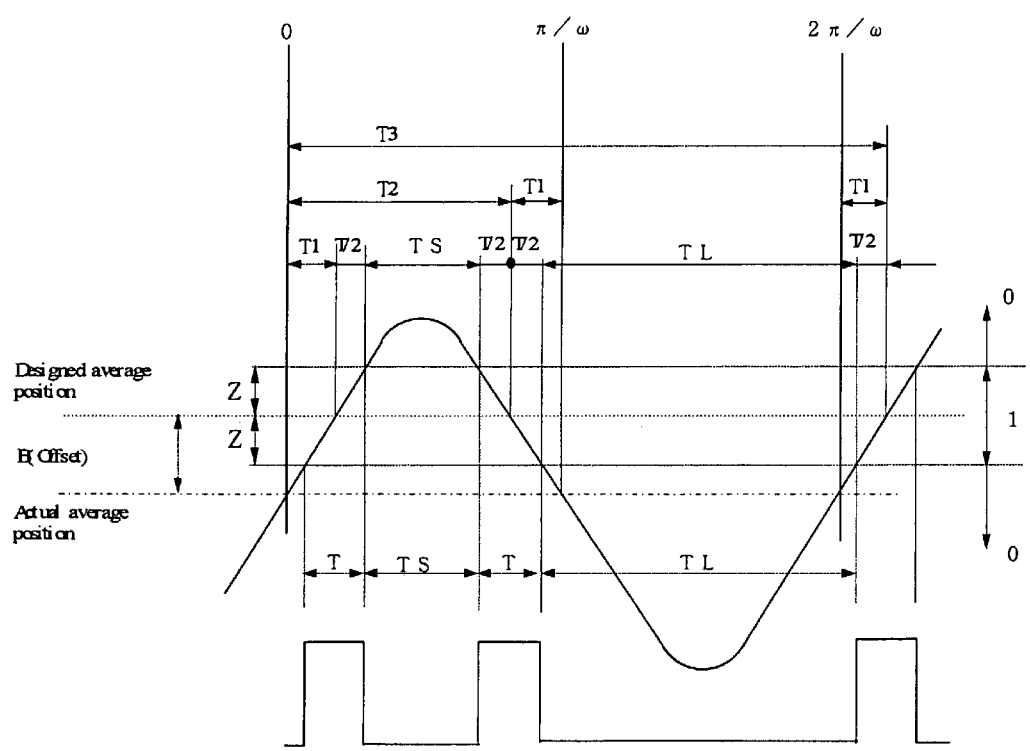
FIG. 5 is a schematic diagram graphically showing relationship between the piston reciprocating motion, the duration of the pulses, and the pulse intervals.

Referring to FIG. 5, offset B is expressed with equation (6).

$$B = A \sin(\omega T1) \quad (6)$$

Where: A=computed stroke
ω=2π*Frequency
T1=elapsed time for the piston to travel between the average piston position and a designed center position T1 is derived from the time length of either of short interval TS or long interval TL as shown below.

The short time interval TS and the long time interval TL are expressed with equation (7) and (8) by analyzing FIG. 5.

$$TS = T2 - T1 - T[s] \quad (7)$$

$$TL = T3 - T2 - T[s] \quad (8)$$

Where:

$$T2 = (\pi/\omega) - T1[s] \quad (9)$$

$$T3 = (2\pi/\omega) + T1[s] \quad (10)$$

T=2Z/ωA (from equation (4))

Substituting T2 in equation (9) into equation (7), or T2 and T3 in equations (9) and (10) into equation (8), solves for T1. In calculation of T1 from equations (4) and equations (7) ~(10), the component 2Z/A is omitted, considering that the distance Z is small compared with stroke A as mentioned above. Then, offset B is computed from the following equations (11) and (12), which are obtained by substituting T1 into equation (6).

$$B = A \sin((\pi - \omega TS)/2) \quad (11)$$

$$B = A \sin(-(\pi - \omega TL)/2) \quad (12)$$

The free piston position computing means 100 measures the duration of the pulses T in the pulse trains generated in the Hall effect type sensor 11 with a digital microcomputer having a timing circuit. Then the free piston position computing means 100 computes stroke A by solving equation (5). Moreover, the piston position computing means 100 measures intervals between the pulses, i.e. short time interval TS or long time interval TL, with the digital microcomputer having the timing circuit, and then computes the offset of the free piston 3 by solving equation (11) or (12), respectively. Other parameter ω, that is, frequency of piston oscillation, which is necessary for computing, can be obtained through measuring cycles of the pulse trains with the digital microcomputer.

The direction of the offset B is determined by physical parameters dependent on the specific implementation. Typically, winding orientation of coil in the driving motor/alternator and polarity of voltage across the winding orientation determines the direction of the offset B. This direction of the offset B is then assigned to the computed value of offset B as a sign, i.e. polarity.

The above mentioned Stirling engine includes a free piston control apparatus for controlling the stroke and the average position of reciprocating motion of the free piston 3 based on computed stroke A and the computed offset B. As shown in FIG. 6, the free piston control apparatus includes a reciprocating motion control means 200 for controlling reciprocating motion of the free piston 3, besides the piston position determining apparatus. The reciprocating motion control means 200 includes a stroke error computing means 211, a stroke error signal processing means 213 and a stroke control means 214, and also includes an offset error computing means 221, an offset error signal processing means 223 and an offset control means 224.

Referring to FIG. 6, the reciprocating motion control means 200 is explained. The free piston position computing means 100 computes the duration of the pulses T and the interval TS or TL between pulses based on the pulse train signals generated in the Hall effect type sensor 11, and computes stroke A and the offset B of the free piston 3 with a digital microcomputer. The computed values of stroke A and the offset B are sent to the stroke error computing means 211 and the offset error computing means 221.

The stroke error computing means 211 compares the above computed value of the stroke A with a designed value recorded in a stroke storage medium 212, i.e. digital memory, and then outputs the difference between the computed value and the designed value of the stroke A as a stroke error signal. The stroke error signal serves as an input signal to the stroke error signal processing means 213, which generates an appropriate stroke command signal output.

The stroke command signal is input to the stroke control means 214, which varies stroke of the free piston 3 by controlling electric load to the alternator 6. In such a case that the free piston 3 is driven by a motor driver like a linear motor in a Stirling cooler, the stroke control means 214 varies stroke of the free piston 3 by controlling electric power provided to the motor driver.

The offset error computing means 221 compares the computed offset B with designed values recorded in an offset storage medium 222, i.e. a digital memory, and outputs the difference between the offset B and the designed values as an offset error signal. The offset error signal serves as an input signal to the offset error signal processing means 223, which generates an appropriate offset command signal output. The offset error signal processing means 223 responds proportionally.

The offset command signal is input to the offset control means 224, which varies strength and polarity of direct current component of current in the alternator 6 or the linear motor, and changes force of axis direction applied to the free piston 3. The average position of the free piston 3 is changed by variation of the force in the direction of its axis, and consequently the offset is controlled. In other embodiment, an electromagnetic valve, which is disposed between the lower space 45 and the center space 44 and flows helium gas back and forth, is opened by the offset control means 224, and the pressure balance imposed on the upper and lower ends of the free piston 3 is varied, thereby the average position of reciprocating motion of the free piston 3 is changed.

Any other appropriate magnetic sensors which generate a pulse signal when magnet flux of the magnet 12 exceeds a pre-set threshold are applicable as a pulse generating means as well as the Hall effect type sensor 11. The stroke error signal processing means 213 and the offset error signal processing means 223 are not limited to means responding proportionally, and any other appropriate means, for example, either a means using a proportional plus integral plus derivative basis, any kind of simple filters, or any kind of combination of simple filters, are applicable.

The designed values of the stroke recorded in the stroke storage medium 212 and the designed values of the offset recorded in the offset storage medium 222 are easily changed with programs according to purposes of free piston machines. The free piston control apparatus according to the present invention can be easily modified to control physical parameters such as temperature or pressure, etc. of the free piston machines. In this case, the values of temperature or pressure are easily controlled to optimum values, by changing programs which decide designed values of the stroke and the offset recorded in storage media 212 and 222.

The present invention is widely applicable to industries such as Stirling engines, Stirling coolers, or any other free piston machines having a free piston with no mechanical connection with a crank shaft and soon.

The invention claimed is:

1. An apparatus for determining free piston position comprising:

an apparatus for determining stroke and average position of reciprocating motion of a free piston in a free piston machine, comprising a pulse train generating means and a free piston position computing means:

said free piston machine having a case enclosing said free piston and a free piston driving means;

said free piston having no mechanical connection with said driving means;

said pulse train generating means having a magnet disposed on said free piston and a magnetic sensor disposed on said case;

said magnetic sensor and said magnet aligned perpendicularly to the direction of reciprocating motion of said free piston when said free piston being positioned at a designed center of reciprocating motion of said free piston;

said magnetic sensor generating pulses when said magnet being positioned within a predetermined distance from said magnetic sensor in the direction of reciprocating motion of said free piston;

said free piston position computing means including measuring means of duration of said pulse, interval between said pulses, and computing velocity of reciprocating motion of said free piston;

said free piston position computing means computing stroke of said free piston based on said duration of pulse and said velocity of reciprocating motion of said free piston; and said free piston position computing means computing offset of the average piston position of reciprocating motion of said free piston from a designed average piston position thereof based on said interval between pulses, computed stroke of said free piston, and said velocity of reciprocating motion of said free piston.

2. An apparatus for determining free piston position according to claim 1, wherein said magnetic sensor is a Hall effect type sensor.

3. An apparatus for determining free piston position according to claim 2, wherein said free piston machine is a Stirling machine.

4. An apparatus for determining free piston position according to claim 1, wherein said free piston machine is a Stirling machine.

5. An apparatus for determining free piston position according to claim 1 or 2 or 3 or 4 and for controlling free piston position wherein, said apparatus for determining stroke and the average position of reciprocating motion of a free piston in a free piston machine, comprises the apparatus for determining free piston position as recited in claim 1 or 2 or 3 or 4 and a reciprocating motion control means of said free piston:

said reciprocating motion control means including a stroke error computing means, stroke error signal processing means, stroke control means, offset error computing means, offset error signal processing means, and an offset control means;

said stroke error computing means computing difference between computed stroke of said free piston and a designed stroke thereof, and outputting said difference as a stroke error signal;

said stroke error signal processing means generating a stroke command signal based on said stroke error signal;

said stroke control means controlling stroke of said free piston based on said stroke command signal;

said offset error computing means computing difference between said offset and a designed offset, and outputting said difference as an offset error signal;

said offset error signal processing means generating an offset command signal based on said offset error signal; and said offset control means controlling the average position of reciprocating motion of said free piston based on said offset command signal.

* * * * *